C. BILHARTZ.
APPARATUS FOR CUTTING INTERNAL AND EXTERNAL SCREW THREADS.
APPLICATION FILED AUG. 1, 1910.

995,997.

Patented June 20, 1911.

UNITED STATES PATENT OFFICE.

CARL BILHARTZ, OF ERSTEIN, GERMANY.

APPARATUS FOR CUTTING INTERNAL AND EXTERNAL SCREW-THREADS.

995,997.  Specification of Letters Patent. Patented June 20, 1911.

Application filed August 1, 1910. Serial No. 575,003.

*To all whom it may concern:*

Be it known that I, CARL BILHARTZ, a subject of the German Emperor, and resident of Erstein, Alsace, Germany, have invented an Apparatus for Cutting Internal and External Screw-Threads, of which the following is a specification.

The subject of the present invention is an apparatus for cutting internal and external screw threads. The apparatus may be used as a separate means for cutting said threads, or it may be fixed on the spindles of drilling machines, milling machines and the like, and it is also adapted to work in either position, horizontally or vertically. In the case of the apparatus being used in connection with one or another of said machines, the article formerly worked on and finally to be provided with an internal or external screw thread, need no more be removed from the drilling machine, milling machine or the like and fixed on a special screwing machine, or worked upon by stocks and dies. Various sizes of screw threads can be cut, as for instance from 1 to 5 inch diameter in the case of gas pipings, without changing any parts, and the removal of the cutting tool in its initial position can be effected in a quick and easy manner.

I will now fully and clearly describe the nature of my said invention with reference to the annexed drawing, in which the apparatus is shown in connection with a drilling or milling machine.

Figure 1:
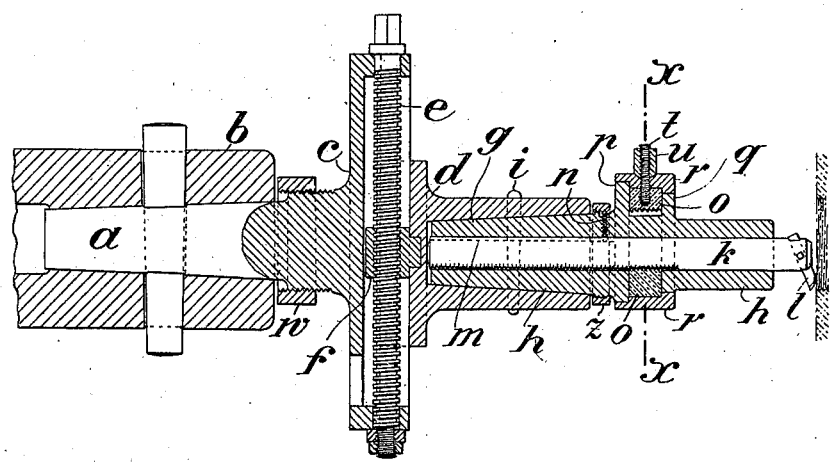
Figure 2:
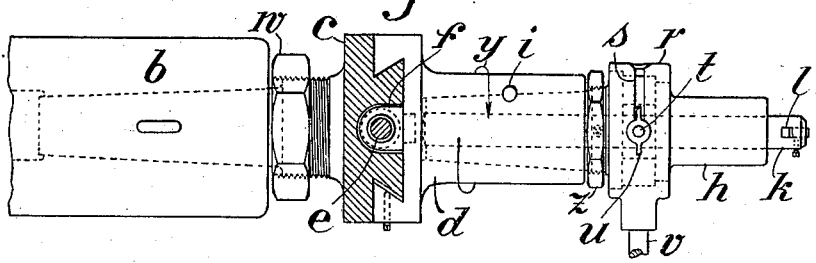
Figure 3:
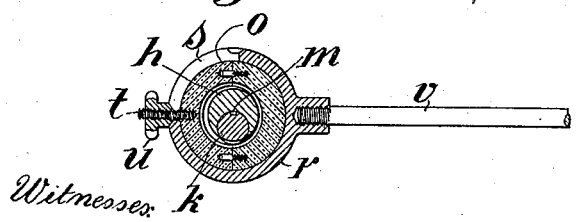
Figure 4:
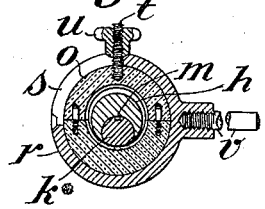

Figure 1 shows a longitudinal section of the apparatus. Fig. 2 is a sectional plan. Fig. 3 is a cross section on line $x$—$x$ Fig. 1, and Fig. 4 is a similar section, showing some parts in displaced position.

The apparatus consists of the slide $d$ adapted to be moved to and fro on the guide block or slide bed $c$ by means of the spindle $e$ and a corresponding nut $f$ provided on said slide. The slide bed $c$ is furnished with a cone $a$, which is adapted to fit in a corresponding bore of the spindle $b$ of a drilling or milling machine, in which bore the said cone and consequently also the whole apparatus is held in a central position by any suitable means; a wedge being shown in the drawing.

The slide $d$ is provided with an extension as clearly shown in Figs. 1 and 2, which said extension is conically drilled out. Into the conical bore of the extension of the slide $d$ fits the conical portion $g$ of the sleeve $h$, which said sleeve is destined to receive the tool holder $k$, which carries at its outer extremity the cutter $l$. The attachment between the slide $d$ and the sleeve $h$ is effected by means of a pin $i$, as particularly shown in Fig. 2, while the tool holder $k$ is prevented from circular movements by means of a set-screw $n$ passed through the sleeve $h$ and fitting with its foremost end in a groove $m$, provided partly along the tool holder $k$. Part of the circumference of the tool holder $k$ is provided with a screw thread, which said screw thread extends along the greater portion of the length of the said holder, and corresponds with the thread to be cut on or into an article. This said thread fits into the thread of a nut $o$, which said nut is constructed of two parts and located between two collars $p$ and $q$ of the sleeve $h$. In order to allow the threaded portion of the tool holder $k$ to fit into the thread of the said nut $o$, an opening is provided at the lower portion of the sleeve $h$, and between the two collars $p$ and $q$, which said opening may be worked in the said sleeve by eccentrically turning it off as shown in Figs. 3 and 4. The circumference of the nut $o$ is also eccentric, and fits in a corresponding ring $r$, which itself fits over the collars $p$ and $q$. This ring is provided with a slot $s$ (see Figs. 2, 3 and 4) through which said slot projects a screw $t$ itself screwed into the one part of the nut $o$. By means of the thumb nut $u$ screwed over the outer end of the screw $t$, the nut $o$ may be secured in position within the ring $r$, while on loosening the said thumb nut, the said nut $o$ can be turned about an angle of about 90°, when the threads of the nut $o$ and the tool holder become disengaged.

On the ring $r$ is attached a rod $v$ by means of which the ring $r$ and also the nut $o$ can be prevented from partaking on the revolutions of the apparatus when in working order. The nuts $w$ and $z$ serve the purpose of easily removing the apparatus from the spindle of the respective machine, and the sleeve from the extension of the slide.

The operation of the apparatus is as follows:—In the position shown in Figs. 1 to 3, the apparatus is in working order, that is to say, the thread of the nut $o$ engages with that of the tool holder $k$, so that on the spindle $b$ and all other parts directly or indirectly connected therewith, being turned in the sense of the arrow $y$, and the nut $o$ and ring *r* being held fast, the tool holder is moved out of said sleeve at a speed according to the pitch of the respective thread. By adjusting the slide *d* the cutting tool can also be adjusted so as to cut a thread on an object brought in contact therewith. After the tool holder has traveled the desired length the machine is thrown out of gear, the slide *d* moved back so that the cutting tool is out of reach of the surface of the object to be provided with a screw thread, and the nut *o* turned in the position shown in Fig. 4. In this position the threads of the tool holder and the nut *o* are disengaged from one another and the tool holder can be moved back in its initial position. It is then only necessary to also re-adjust the nut *o* and the cutter *l* when the cutting of thread can be repeated.

In case an external thread is desired to be cut, it is only required to turn the cutter *l* about an angle of 180°, and to adjust the apparatus in a similar manner as described above.

The sleeve *h* may also be constructed in one piece with the slide, but it has been found more practical to keep it separately as in this case, tools for milling, drilling, turning, and the like may be inserted instead of the said sleeve and parts connected therewith.

Having fully described my invention, what I claim and desire to secure by Letters Patent is:—

1. An apparatus for cutting internal and external screw threads, comprising in combination, a slide, a slide bed, means for moving said slide on said bed, an extension provided on said slide, and having a conical bore, a sleeve, fitting in said bore, a tool holder provided with an external screw thread and carried by said sleeve, means for preventing said tool holder from circular movements, a two-part nut, arranged around said sleeve, the thread of said nut being adapted to engage with the thread of the tool holder, means for adjusting said nut and means for holding said nut in position, substantially as described.

2. An apparatus for cutting internal and external screw threads, comprising in combination, a slide bed, a slide, mounted on said bed, and means for adjusting said slide on said bed, an extension provided on said slide and having a conical bore, a sleeve fitting in said bore, a tool holder, provided with an external screw thread over a portion of its surface and extending along the greater portion of its length, said tool holder being carried by the said sleeve, and having a groove, a screw passed through the wall of said sleeve and projecting into the said groove, two collars, provided on said sleeve, a two part nut, eccentrically located between said collars, relative to said tool holder, a ring for holding said nut in position, a slot provided in said ring, a screw, screwed into one half of the said two part nut and extending through said slot for adjusting the two part nut, the threaded bore of which is larger in diameter than the tool holder and a thumb nut for securing the said two part nut in a determined position, substantially as described.

In testimony whereof I have hereunto set my hand in the presence of two subscribing witnesses.

CARL BILHARTZ.

Witnesses:
JAKOB RUDY,
ALFONS LEHMANN.

---

Copies of this patent may be obtained for five cents each, by addressing the "Commissioner of Patents. Washington, D. C."